United States Patent [19]

Davis

[11] Patent Number: 5,345,225
[45] Date of Patent: Sep. 6, 1994

[54] TAMPER DETECTION SYSTEM FOR LOAD MANAGEMENT DEVICE

[75] Inventor: Glenn A. Davis, Lilburn, Ga.

[73] Assignee: Scientific-Atlanta, Inc., Atlanta, Ga.

[21] Appl. No.: 969,123

[22] Filed: Oct. 30, 1992

[51] Int. Cl.[5] .......................................... G08B 21/00
[52] U.S. Cl. ................................. 340/635; 307/38; 340/540; 340/644; 340/653; 340/664
[58] Field of Search ............... 340/653, 644, 635, 664, 340/540; 307/38, 40

[56] References Cited

U.S. PATENT DOCUMENTS

| | | | |
|---|---|---|---|
| 4,086,434 | 4/1978 | Bocchi | 379/91 |
| 4,190,800 | 2/1980 | Kelly, Jr. et al. | 340/310 A |
| 4,675,896 | 6/1987 | Young | 340/653 |
| 5,015,944 | 5/1991 | Bubash | 340/664 |

OTHER PUBLICATIONS

A promotional brochure entitled "Digital Control Unit Series DCU-S2000A," which is distributed by Scientific Atlanta. The date of the brochure is not known, but the device shown in the brochure was on sale more than one year before the filing date of the present application.

Primary Examiner—Glen Swann
Attorney, Agent, or Firm—Jones & Askew

[57] ABSTRACT

A tamper detection system for promptly warns a utility that it has lost control of a load which is part of a load management system, and may be giving price incentives to a customer without receiving the corresponding benefit arising from the intended control of the load. A monitor circuit automatically determines whether the load management device is connected to the load by detecting whether a current is passing via the load control device to the load, and generates a warning signal when no current is detected for a first predetermined period of time. The load current is detected either by inductively coupling a conductor to the load with a sensing conductor, or by sensing current induced in the load control relay as the load current passes through the relay contacts. The tamper detection feature operates without any activity of the load management device, and detects disconnection of the load even when the load management device itself is powered up and working properly.

35 Claims, 4 Drawing Sheets

TAMPER DETECTION SYSTEM FOR LOAD MANAGEMENT DEVICE

TECHNICAL FIELD

The present invention relates generally to electrical utility load management systems, and more particularly relates to an improved electrical load management device which monitors current supplied to the electrical load and detects when the load management device has been disconnected.

BACKGROUND OF THE INVENTION

Electrical load management systems for allowing an electrical utility to control the load on an electrical distribution system are known in the art. These systems divert energy requirements to minimize electrical black-outs or "brown-outs". For example, U.S. Pat. No. 4,190,800 to Kelly, Jr. et al., entitled "Electrical Load Management System", assigned to the same assignee as the present invention, describes an electrical load management system wherein a utility command center monitors the use of electrical power and, when peak demand periods occur, transmits coded information by radio from the command center to remote receivers mounted proximate the electrical loads. In this patent, the transmitted signal includes address and command information that is decoded at the receivers. Receivers addressed by the command center pass command information over the distribution lines to the electrical loads, and thereby control the operation of the customers' power consuming devices.

Other load management systems utilize separate radio receivers at each customer's location, rather than providing a receiver at the distribution transformer as in the aforementioned patent. Examples of this type system include the types DCU-1120, -1170, -1180, -1190, and -S2000A utility radio switches, otherwise described as digital control units or load control switches, manufactured by Scientific Atlanta, Inc., Atlanta, Ga., and the type REMS-100 radio switch manufactured by General Electric, King of Prussia, Pa. These utility radio switches incorporate an FM receiver that can receive a transmitted signal up to about 25 miles from a transmitter site located at a command center. The transmitter issues commands to temporarily remove power from a selected load. This self-contained receiver is typically mounted on or immediately adjacent to the electrical loads under control, and receives its power from the line that feeds the controlled loads. Switches, jumpers, or other means contained within the receiver configure the receiver to respond only to a particular address or set of addresses, so that different geographical areas, types of appliances, or numbers of consumers may be separately controlled.

Such a load management system reduces peak power demand and therefore the utility need not generate or import as much additional power. In order to induce more customers to participate in their load management programs, utilities typically offer price incentives to participants.

However, if the load management device has been bypassed through tampering or by a service technician working on a controlled appliance, the utility cannot promptly discover the problem. Air conditioning technicians in particular may not understand the function of the load management device. They often disconnect the air conditioner's thermostatic control circuit from the contacts of the device as a troubleshooting procedure. After the trouble with the air conditioner has been solved, the technician may not reconnect it to the load management device, leaving the utility with no control over the appliance. The utility will continue to discount the participant's bill without the benefit of disconnecting the appliance during peak power consumption.

As a result of this problem, utilities have sought a tamper detection system for several years. One early attempt provided a circuit for monitoring the coil of the load switch relay for continuity. While detecting failure of the relay, that method would not determine whether the contact circuit was still connected to the load. Another method was to measure the voltage induced in the load switch relay coil across the contacts when the load was reconnected. It was common for the load, such as a hot water heater, to be drawing current upon reconnect when the appliance had been cut off for a period of time by the load management device. Therefore, voltage would be induced in the coil by the load current passing through the contacts of the load management device. A microprocessor in the system would determine whether the ratio of reconnects with current to those without current was acceptable. An unacceptable ratio would be taken to evidence of tampering. Because this method depended on load management activity to have a monitored event, it was effective only when the utility used the load management system often. Utilities therefore have had a need for a tamper detection system that operates without any activity of the load management device.

Thus, there has been a need for a low cost tamper detection system that is relatively simple and cost effective to implement, operates without any activity of the load management device, warns the utility promptly when a load has been disconnected from the load management device, and detects disconnection even when the management device itself is powered up and working properly.

SUMMARY OF THE INVENTION

The present invention solves the above-described problems in the art by providing in a load management device a circuit which automatically monitors whether the load management device is connected to the load and generates a warning signal if the load is not connected. Thus, utilities can use the present invention to assure that they are managing the loads for which they have provided load management devices.

Generally described, the present invention provides a method and apparatus for monitoring the connection status of a load control device, which detects whether a current is passing via the load control device to a load, and generates a warning signal when no current is detected for a first predetermined period of time.

In the preferred embodiment of the invention, the first period of time is reset upon detection of current passing to the load, preferably only after the current has been present for a second predetermined period of time. The warning signal is preferably directed to a data storage device where it sets a memory location to a predetermined state. The predetermined memory state can be read to determine whether the load has been disconnected from the load control device. Preferably, the memory state can be read by a visiting utility technician on site, or by transmission of the stored data to a remote location. Furthermore, a visual indicator, such as a flashing LED, can be activated on the load control device to alert utility personnel.

The apparatus preferably senses the presence of current passing through the load control device to a small current load, such as an air conditioner controller, by passing both a conductor connected to the load and a sensing conductor through a coupling loop of magnetic material. The loop induces a current in the sensing conductor when current is flowing in the load conductor, and the induced current is monitored. In the case of a large current load, such as a hot water heater, the presence of load current may be detected by measuring current induced in the coil of the load control relay.

Thus, it is an object of the present invention to provide a load management or load control device capable of monitoring the connection status of the device.

It is a further object of the present invention to provide a load control device that warns a utility promptly and automatically when a load under control has been disconnected from the device.

It is a further object of the present invention to provide a tamper detection system for a load control device that functions without operation of the load control device.

It is a further object of the present invention to provide a tamper detection system for a load control device that detects disconnection of the load being controlled even when the management device itself is powered up and working properly.

Other objects, features, and advantages of the present invention will become apparent upon examination of the following description of the preferred embodiment of the invention, taken in conjunction with the drawings and the appended claims.

DETAILED DESCRIPTION OF THE PREFERRED EMBODIMENT

Figure 1:
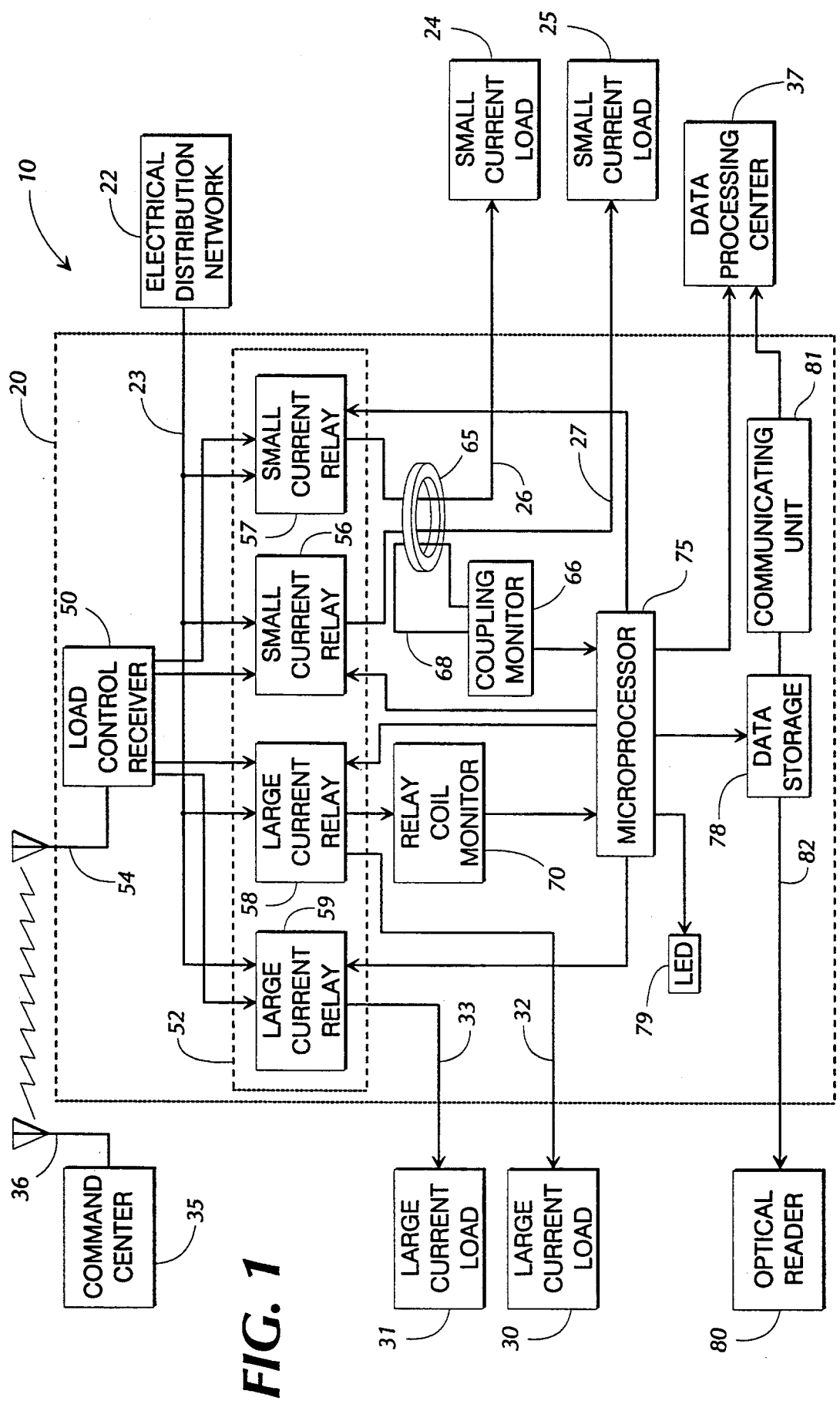
FIG. 1 is a block diagram of an electrical load management system embodying the present invention.

Referring now to the drawings, in which like numerals indicate like elements throughout the several figures, FIG. 1 illustrates an electrical load management system 10, including a load control switching and monitoring apparatus 20 connected between an electrical distribution network 22 and an electrical load. The apparatus 20 operates to control the energy supplied to the electrical load, which may be a particular utility customer's appliance such as a hot water heater or air conditioner.

Furthermore, the apparatus 20 may control a set of loads at each customer location. For example, the location may contain two small current loads 24 and 25, such as two air conditioner controllers having 24 volt thermostatic control systems, and two large current load 30 and 31, such as 240 volt hot water heaters. The utility supplies electrical energy to the electrical loads 24, 25, 30 and 31 by distributing energy from the electrical distribution network 22, via a power line 23, to the load control switching and monitoring apparatus 20. In response to a command transmitted by the utility, the apparatus 20 controls the output of electrical energy to the loads via conductors 26, 27, 32 and 33, respectively.

The electrical load management system 10 further includes a command center 35 and a data processing center 37. The command center 35 transmits command signals to the load control switching and monitoring apparatus 20 for initiating load control operations and thereby controls the amount of energy consumed by the utility's customers during peak power consumption periods. The data processing center 37 receives load control operation information and energy consumption information collected by the apparatus 20 via a communicating unit 81. Each of the command center 35 and the data processing center 37 is remotely located from the electrical loads.

The command center 35 preferably includes a wireless communications system, such as a radio frequency (RF) transmitter that transmits command signals via a transmitting antenna 36. Those persons skilled in the art will appreciate that the command center can also be implemented as a power line carrier system or as a telephone system to supply a communications link between the respective locations of the command center 35 and the apparatus 20.

The electrical utility services many customers and, accordingly, the electrical distribution network 22 distributes energy to each of a set of loads located within a defined geographical region. Those skilled in the art will appreciate that the utility will typically install the load control switching and monitoring apparatus 20 either on or adjacent to the location to be controlled to enable the utility to individually control the power consumed by each appliance of each utility customer. Accordingly, it will be understood that the electrical load management system 10 includes a group of load control and monitoring devices, as represented by the load control switching and monitoring apparatus 20, and groups of loads, such as the electrical loads 24, 25, 30 and 31.

The load control switching and monitoring apparatus 20 includes a load control receiver 50 and a control relay unit 52. The control relay unit 52 accepts electrical energy from the electrical distribution network 22 via the power line 23. In the embodiment shown, the unit 52 includes four load control relays, two small current relays 56 and 57, and two large current relays 58 and 59. The small current relays are used to control appliances such as air conditioners which have low voltage control circuits, whereas the large current relays are used to control heavy duty appliances such as hot water heaters. The load control receiver 50 receives command signals from the command center 35 via a receiving antenna 54. The control unit 52, which operates as a conventional load control switch, removes the electrical loads 24, 25, 30 and 31 from the network 22 upon receipt by the receiver 50 of a selected command signal. The command signal includes an address component unique to a particular load control device 20, and a function component unique to one of the four load control relays. The utility thus can control four appliances individually using command signal technology well known to those skilled in the art. In response to other command signals, the control unit 52 may individually restore the supply of electrical energy to the loads by inserting the loads into the network 22.

For the preferred embodiment, the combination of the load control receiver 50 and the control unit 52 is a type DCU-S2000A radio switch manufactured by Scientific Atlanta, Inc., Atlanta, Ga. Means of construction of the control unit 52 are well known to those skilled in the art and details are available from the manufacturer. Furthermore, the structure and operation of an exemplary electrical load management system comprising a utility transmitter and a plurality of load control receivers, such as the control unit 52, for receiving coded information by radio from the command center is shown in U.S. Pat. No. 4,190,800 to Kelly, Jr. et al., assigned to the same assignee as the present invention, the disclosure of which is incorporated herein by reference and made a part hereof.

The structure and operation of an exemplary data collection system for receiving and reporting utility meter readings from a remote location is shown in U.S. Pat. No. 4,086,434 to Bocchi, the disclosure of which is incorporated herein by reference and made a part hereof.

The control relays 56, 57, 58 and 59 accept electrical energy via the power line 23 from the electrical distribution network 22. By removing the electrical loads in response to a selected decoded command signal, the control relays prevents any electrical energy from reaching the electrical loads 24, 25, 30 and 31 via the conductors 26, 27, 32 and 33. In this manner, the utility individually controls the amount of energy consumed by a utility customer. The control relay circuit 52 also operates to restore the distribution of energy to the loads by inserting the loads within the network 22 in response either to the lapse of a predetermined time period or to another decoded command signal.

The conductors 26 and 27 connecting the relays 56 and 57 to the small current loads 24 and 25 pass through a coupling loop 65 of a coupling current monitor 66. The monitor 66 also has a sensing conductor 68 which passes through the coupling loop 65. As explained in detail below, the coupling loop 65, preferably a ferrous toroid, couples the load current in the conductors 26 and 27 to the sensing conductor 68. Current induced in the sensing conductor 68 provides a signal indicating that current has been detected in one of the conductors 26 or 27.

Those persons skilled in the art will recognize that devices other than the coupling loop 65 and the sensing conductor 68 can be used to detect the presence of current within one of the conductors 26 or 27. For example, a resistor or a triac having a sufficient power rating can be placed in series with the small current loads 24 and 25 to provide a measurable voltage when the network 22 is supplying electrical energy to those loads. Accordingly, it will be appreciated that the presence of current passing via the series resistor or triac device to the loads 24 or 25 would be monitored by a monitoring device, such as the coupling monitor 66.

Current passes directly from the relays 58 and 59 to the large current loads 30 and 31 along conductors 32 and 33. The load current passing through the contacts of the control relay 58 induces a current in the coil of the relay. As explained in detail below, the presence of current passing via the load management device 20 to the load 30 is monitored by detecting this induced current. A relay coil monitor circuit 70 connected to the control relay 58 performs this function.

The two current monitors 66 and 70 provide outputs to a microprocessor 75, which includes onboard memory and an onboard counter. Following logic explained below, the microprocessor 75 keeps track of the time during which no current has passed through the load management device 20 to at least one of the small current loads 24 and 25 and to the large current load 30. In the embodiment shown, the large current load 31 is not monitored; those skilled in the art will understand that a monitoring circuit similar to the monitor 70 could be provided for the load 31.

When a "no current" condition has lasted for a predetermined period of time for one of the monitored loads, this is taken as evidence of disconnection of the device 20 from the load. The microprocessor 75 then sets a tamper flag in its internal memory and also sets a tamper flag in an external memory or data storage device 78 that is connected to the microprocessor. The purpose of the duplicate external memory is to avoid tampering with the tamper flags themselves by the intentional reset of the microprocessor. When these memory flags are in a state indicating detection of tampering, the microprocessor causes a test LED 79 on the panel of the load management device 20 to flash. Furthermore, the state of the memory locations can be read by a technician with a conventional optical reader 80 via an optical interface 82. The data storage device 78 also can provide the data stored therein to the communicating unit 81, which sends the data to the data processing center 37 via a communications link 38 in a well known manner.

Thus, a system embodying the present invention provides an early warning to the utility that the load management device 20 is no longer controlling certain loads at a particular customer location.

Figure 2A:
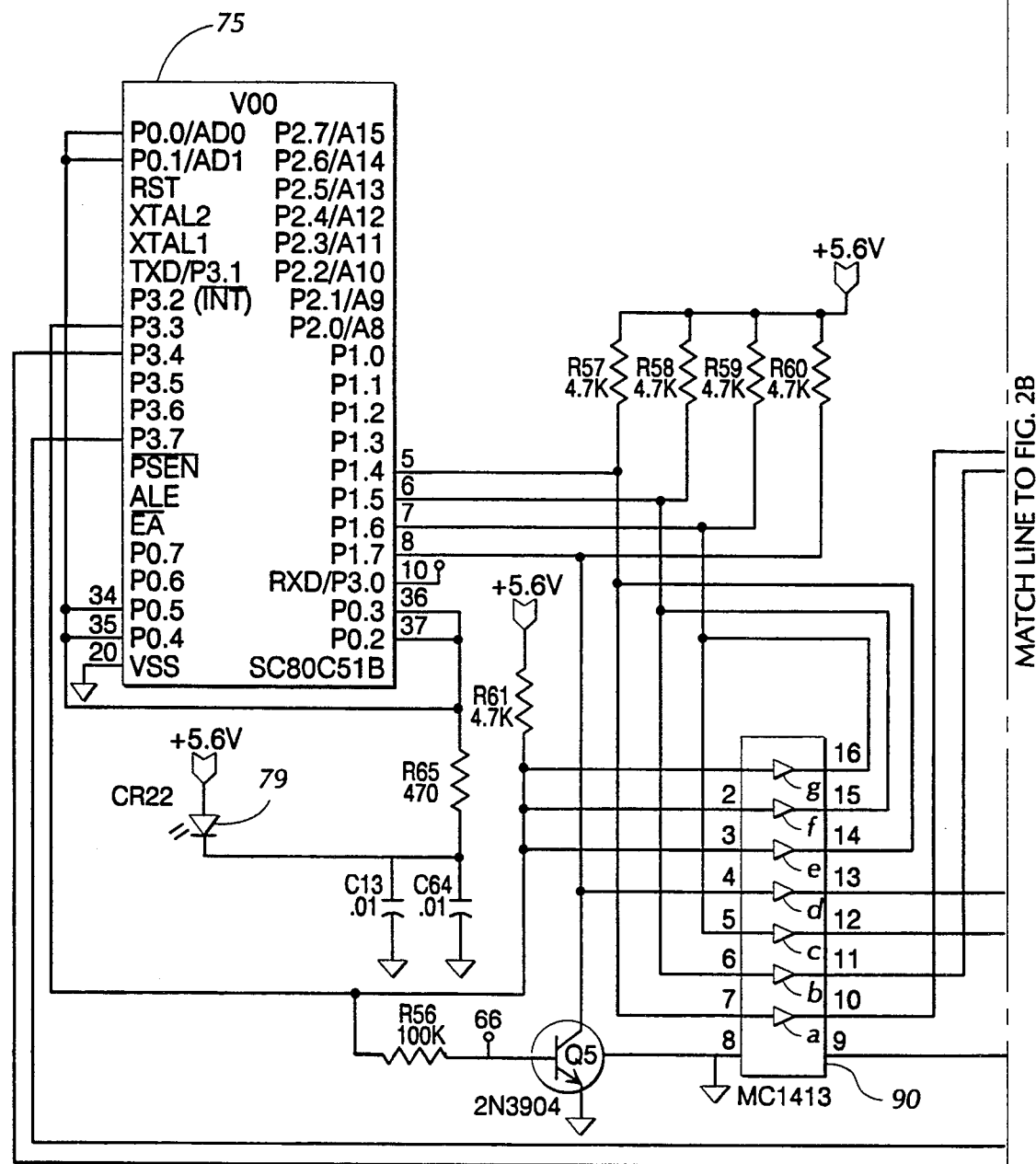
FIGS. 2A and 2B show a schematic of the monitoring circuit associated with the load management system.
Figure 2B:
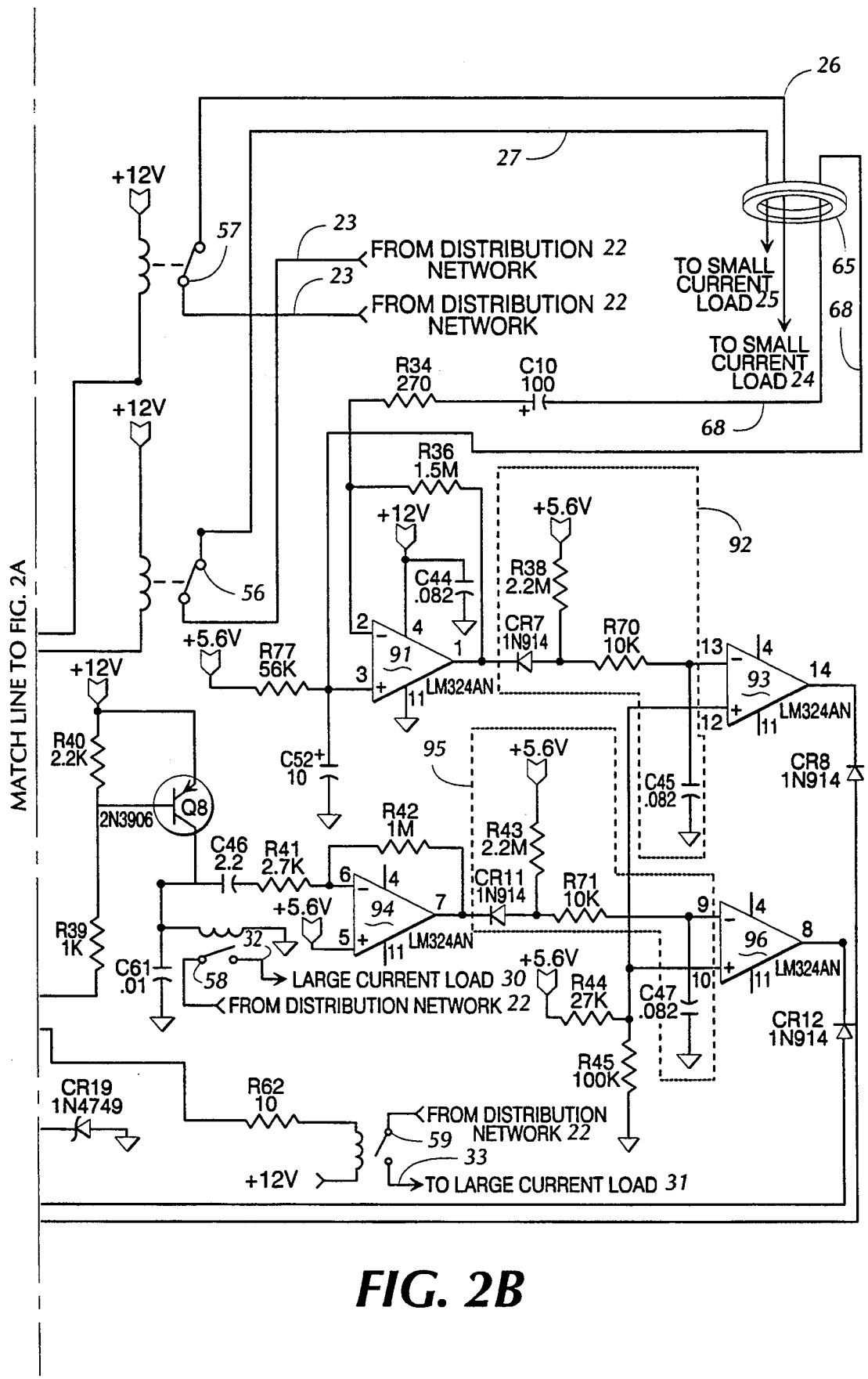

FIGS. 2A and B, which are collectively referred to herein as FIG. 2, show a schematic of the monitoring circuit associated with the electrical load management system 10. Referring now to FIGS. 1-2, the microprocessor 75 controls the operating position of the small current relays 56 and 57 and the large current relays 58 and 59. For example, the wiper of the small current relay 56, which is normally in the closed position (as shown in FIG. 2), moves to the open position when the relay is powered by a relay control signal generated by the microprocessor 75. The open position of the relay 56 interrupts the distribution of electrical energy to the small current load 25 by disconnecting the network 22 from the load 25. In this manner, the utility reduces the amount of electrical energy drawn by the load 25 by removing the load from the network 22 for a predetermined period of time.

When the load control receiver 50 receives and decodes a command signal having a function code for powering the small current relay 56, a Port P1.5 of the microprocessor 75 outputs a relay control signal having a TTL high level to a relay driver 90. The relay driver 90, which is connected between the microprocessor 75 and the small current relays 56 and 57 and the large current relays 58 and 59, preferably comprises an array of inverting amplifiers 90a-90g. The relay driver 90 amplifies certain relay control signals output by the microprocessor 75 because the microprocessor 75 lacks sufficient output power to drive a relay. The relay driver 90 is preferably a high voltage, high current Darlington transistor array, such as model MC1413 manufactured by Motorola, Inc. in Phoenix, Ariz.

In response to the TTL high level signal output by the Port P1.5, the inverting amplifier 90b outputs an amplified signal having a TTL low level to a contact on one side of the relay coil of the small current relay 56. The contact on the other side of the relay coil is connected to a voltage source, +12 volts, which supplies a voltage reference for the relay 56. The wiper of the relay 56 moves from the closed position to the open position when the inverting amplifier 90b applies the TTL low level signal to the relay coil, thereby disconnecting the load 25 from the network 22.

In contrast, the relay 56 remains in the closed position, otherwise referred to as a relaxed state, when the inverting amplifier 90b outputs an amplified signal having a TTL high level in response to a TTL low level signal supplied by the Port P1.5. During the relaxed state, the relay 56 is closed to complete a conductive path for the distribution of electrical energy from the network 22 to the load 25. The conductive path comprises the conductor 23, the closed relay 56, and the conductor 27.

The coupling monitor 66 detects whether the network 22 is supplying current to the load 25 via the small current relay 56 by monitoring the presence of induced current carried by the sensing conductor 68. The sensing conductor 68 loops through the coupling loop 65 and connects to the coupling monitor 66. When electrical energy is supplied to the load 25, current carded by the conductor 27 induces current within the sensing conductor 68 because the conductors 27 and 68 pass through the coupling loop 65. The coupling loop 65 is preferably a model 56822-7D manufactured by Magnetics in East Butler, Pa.

The sensing conductor 68 supplies the induced current to the coupling monitor 66, which includes an amplifier 91, a peak detector 92, and a comparator 93. One end of the sensing conductor 68 is connected to the inverting terminal of the amplifier 91 via a coupling capacitor $C_{10}$ and a resistor $R_{34}$. The other end of the sensing conductor 68 is connected to a junction formed by a resistor $R_{77}$ tied to a voltage source, +5.6 volts, a capacitor $C_{52}$ tied to ground, and the noninverting terminal of the amplifier 91. The amplifier 91 is a high gain amplifier that amplifies the relatively low level of induced current to a threshold sufficient for detection by the peak detector 92. The gain of the amplifier 91, which is set by the resistor $R_{34}$ and a feedback resistor $R_{36}$ connected between the amplifier output and the inverting terminal, is approximately 75 dB for the respective resistor values shown in FIG. 2. The amplifier 91 is preferably a model LM324AN, which is a semiconductor device containing four identical operational amplifiers. The model LM324AN is manufactured by National Semiconductor Corporation in Santa Clara, Calif.

The amplified output of the amplifier 91 is supplied to the peak detector 92, which comprises a diode $CR_7$, a resistor $R_{38}$ tied to the voltage source of +5.6 volts, a resistor $R_{70}$, and a storage capacitor $C_{45}$ connected to ground. The cathode of the diode $CR_7$ is connected to the output of the amplifier 91 and the diode anode is connected to a junction formed by the resistor $R_{38}$ and a terminal of the resistor $R_{70}$. The other terminal of the resistor $R_{70}$ is connected to the inverting terminal of the comparator 93 and the storage capacitor $C_{45}$.

When the output of the amplifier 91 swings in a negative direction, the diode $CR_7$ conducts and the amplifier 91 pulls current through the diode $CR_7$ and the resistors $R_{38}$ and $R_{70}$, thereby quickly discharging the stored voltage held by the storage capacitor $C_{45}$. The resistor $R_{70}$ effectively slows the detection operation to prevent the peak detector 92 from supplying a detected signal in response to a transient output by the amplifier 91. The storage capacitor $C_{45}$ recharges by drawing current through the series path formed by the resistor $R_{70}$ and the resistor $R_{38}$ when the output of the amplifier 91 swings in the positive direction because the diode $CR_7$ enters a nonconductive state. However, the capacitor $C_{45}$ preferably recharges much more slowly than it discharges because the resistor value for the resistor $R_{38}$ is large, preferably greater than 2 MOhms. Thus, the peak detector 92 generates a peak value of the output of the amplifier 91 by quickly discharging the capacitor $C_{45}$ when the amplified output swings in the negative direction and slowly recharging the capacitor $C_{45}$ when the amplified output swings in a positive direction.

The output of the peak detector 92 is applied to the inverting terminal of the comparator 93. The noninverting terminal of the comparator 93 is connected to a voltage divider that sets the reference voltage for the comparator 93. The reference voltage is present at the junction formed by a resistor $R_{44}$ connected to +5.6 volts and a resistor $R_{45}$ tied to ground. When the output of the peak detector exceeds the reference voltage, the comparator 93 toggles and sends a current monitor signal to Port P3.4 of the microprocessor 75. For the preferred embodiment, the output of the peak detector 92 forces the comparator 93 to toggle and supply a TTL high signal to the Port P3.4 upon detection of the induced current carried by the sensing conductor 68. Otherwise, the output of the comparator 93 remains at a TTL low level, thereby indicating that the coupling monitor 66 has not yet detected induced current. The comparator 93 is preferably one of the four operational amplifiers provided by the model LM324AN device.

The output of the comparator 93 supplies the current monitor signal to the Port P3.4 via a diode $CR_8$, which operates to disconnect the comparator output from the microprocessor port during overvoltage events. Specifically, the diode $CR_8$ does not conduct when the comparator output applied to the diode cathode exceeds the voltage presented by the Port P3.4 to the diode anode. In this manner, the microprocessor 75 is not damaged if the output of the comparator 93 swings from a low voltage level to the supply voltage source of +12 volts. The construction and operation of the small current relay 57 is similar to the small current relay 56. For example, the relay 57 opens and disconnects the load 25 from the network 22 when the relay coil of the relay 57 is powered by a relay control signal supplied by the microprocessor 75. Specifically, Port P1.4 of the microprocessor 75 outputs a control relay signal having a TTL high level when the load control receiver receives and decodes a command signal having a function code for energizing the relay 57. In response to the control relay signal, the inverting amplifier 90a outputs an amplified signal having a TTL low level to energize the relay coil of the relay 57. The reference voltage applied to the relay 57 is a voltage source, +12 volts. Thus, the wiper of the relay 57 moves from the closed position to the open position when the relay coil is energized by the microprocessor 75.

Electrical energy is supplied by the network 22 to the load 25 via the relay 57 when the small current relay 57 is in a relaxed state. The relay 57 remains in the normally closed state if the relay coil is not energized by a control relay signal output by the microprocessor 75. Specifically, the relay 57 remains in the closed position when the inverting amplifier 90a outputs a TTL high level signal to the relay coil of the relay 57 in response to a TTL low level signal output by Port P1.4. A conductive path formed by the conductor 23, the closed relay 57, and the conductor 26 supplies current to the load 25 from the network 22.

Similar to the monitoring operation associated with the small current relay 56, the coupling monitor 66 also monitors the sensing conductor 68 to detect the presence of electrical energy supplied via the small current relay 57. The current carried by the conductor 26 induces a current in the sensing conductor 68 because the conductor 26 and the sensing conductor 68 pass through the coupling loop 65. In response to the induced current, the amplifier 91, the peak detector 92, and the comparator 93 perform the previously described operations and the coupling monitor 68 sends a TTL high level signal to the microprocessor 75. Otherwise, the coupling monitor 68 supply a TTL low level signal to the microprocessor 75 in the absence of induced current.

Following the logic shown in FIG. 3 and described below, the microprocessor 75 determines that current has passed through the load management device 20 to at least one of the small current loads 24 and 25 when a TTL high level signal is applied by the output of the comparator 93 to the Port P3.4.

For the large current loads 30 and 31, the operating position of the large current relays 58 and 59 determines whether electrical energy is passed from the network 22 to those loads. If the relay coil of either the relay 58 or the relay 59 is energized by the microprocessor 75, then the wiper of the relay moves from the normally closed position to the open position, thereby interrupting the flow of current to the load connected to the open relay. The relay coil monitor 70 provides the microprocessor 75 with an indication of whether one of the loads, the large current load 30, is receiving electrical energy from the network 22 via the relay 58.

Port P1.7 of the microprocessor 75 outputs a control relay signal having a TTL high level when the load control receiver 50 receives and decodes an instruction signal having a function code for energizing the relay 58. In response to the control relay signal, the inverting amplifier 90d outputs an amplified signal having a TTL low level via a resistor $R_{39}$ to the junction formed by the base of a driver transistor $Q_8$ and a resistor $R_{40}$ tied to +12 volts. For the transistor $Q_8$, the emitter is connected to a voltage source, +12 volts, and the collector is connected to one side of the relay coil of the relay 58. Although the transistor $Q_8$ is normally in the OFF state, the transistor turns ON when the TTL low level signal is applied to the base terminal, thereby enabling the collector to supply approximately +12 volts to one side of the relay coil of the relay 58. The relay 58 opens when the positive voltage is applied to one side of the relay coil because the other side of the relay coil is connected to a reference voltage of ground potential. Thus, the supply of electrical energy to the large current load 30 is interrupted when the large current relay 58 is in the open state.

As will be described in more detail below, ground is used as the voltage reference for the relay 58 instead of the more commonly used voltage reference provided by a power source, such as the +12 volts used for the relays 56 and 57 (and the relay 59).

The large current relay 58 remains in the closed state when the output of the Port P1.7 is set to a TTL low level signal. The inverting amplifier 90d subsequently outputs an amplified signal having a TTL high level signal to the base of the transistor $Q_8$, thereby turning OFF the transistor $Q_8$ and setting the collector to a ground potential via a capacitor $C_{61}$ and the resistance of the relay coil of relay 58. Accordingly, the relay 58 remains in the closed position because the relay coil is not energized when the transistor $Q_8$ is in the OFF state. Current flows from the network 22 to the large current load 30 via the conductive path formed by the conductor 23, the closed relay 58, and the conductor 32. The current passing through the signal path provided by the closed relay 58 induces a measurable field within the relay coil because the large current load 30 draws a substantial amount of current from the network 22. By monitoring the relay coil, the relay coil monitor 70 supplies the microprocessor 75 with an indication of current detection when the monitor 70 detects a measurable current field in the relay 58.

The relay coil monitor 70 comprises an amplifier 94, a peak detector 95, and a comparator 96. In response to current induced within the relay coil of the relay 58, the amplifier 94 outputs an amplified signal having a level sufficient for detection by the peak detector 95. The peak detector 95 detects the peak level of the amplified signal and outputs the detected peak level to the comparator 96. If the peak level exceeds the reference voltage of the comparator 96, then the comparator 96 toggles and outputs a TTL high level signal to Port P3.7 of the microprocessor 75.

When a measurable field is present in the relay coil of the relay 58, the induced current is supplied from the relay coil to the inverting terminal of the amplifier 94 via a coupling capacitor $C_{46}$ and a resistor $R_{41}$. A voltage source, +5.6 volts, is applied to the noninverting terminal of the amplifier 94. The amplifier 94 amplifies the signal applied to its inverting terminal to supply an amplified signal having a sufficient voltage for detection by the peak detector 95. Similar to the amplifier 91, the amplifier 94 is a high gain amplifier having a gain determined by a feedback resister, resister $R_{42}$, and an input resister, the resister $R_{41}$. For the preferred resistor values shown in FIG. 2, the gain of the amplifier 94 is set to approximately 51 dB. The amplifier 94 is preferably one of the four operational amplifiers provided the model LM324AN device.

The operation and the construction of the peak detector 95 and the comparator 96 are similar to their respective counterparts in the coupling monitor 66: the peak detector 92 and the comparator 93. The peak detector 95, which is connected between the output of the amplifier 94 and the inverting terminal of the comparator 96, comprises a diode $CR_{11}$, a resister $R_{43}$, a resister $R_{71}$, and a storage capacitor $C_{47}$. The comparator 96 is preferably identical to the device used for the comparator 93, a model LM324AN operational amplifier. The noninverting terminal of the comparator 96 is connected to the same voltage reference applied to the noninverting terminal of the comparator 93. When the detected voltage output by the peak detector 95 exceeds the reference voltage, the output of the comparator 46 toggles and supplies a TTL high level signal to Port P3.7 of the microprocessor 75. The TTL high level signal supplies the microprocessor 75 with an indication that current is passing from the network 22 via the closed relay 58 to the load 30. A diode $CR_{12}$, which is connected between the output of the comparator 96 and the Port P3.7, provides overvoltage protection for the microprocessor port in a manner similar to the diode $CR_8$.

Although a positive voltage supplied by a power supply is typically used as the voltage reference for a relay, a ground reference is used for the relay 58 to prevent the amplifier 94 from amplifying any 60 cycle ripple passing through the relay coil if connected to such a power supply reference. Those persons skilled in the art will recognize that the use of a ground reference for the relay 58 minimizes the possibility that the relay coil will pick-up 60 cycle ripple. Thus, the driver transistor $Q_8$ is necessary to invert the amplified signal generated by the inverting amplifier 90d because, unlike the relays 56 and 57 (as well as relay 59), the relay 58 is energized by applying a TTL high level signal to the relay coil.

The microprocessor 75 controls the operating state of the relay 59 by sending a control relay signal to the relay coil of the relay 59 via the inverting amplifier 90c. Specifically, Port P1.6 of the microprocessor 75 outputs a control relay signal having a TTL high level to the inverting amplifier 90c when the load control receiver 50 receives and decodes a command signal having a function code for energizing the large current relay 59. In response to the control relay signal, the inverting amplifier 90c outputs an amplified signal having a TTL low level to one side of the relay coil of the relay 56. The other side of the relay coil is connected to a voltage reference, +12 volts. Thus, the wiper of the relay 59 moves from the normally closed position to the open position in response to the TTL low level signal. By operating in the open position, the relay 59 interrupts the flow of electrical energy from the network 22 to the load 3 I. In contrast, the relay 59 operates in the normally closed position when the Port P1.6 outputs a control relay signal having a TTL low level to the relay coil via the inverting amplifier 90d. By operating in the closed position, the relay 59 completes a conductive path between the network 22 and the load 31 by connecting the conductor 23 to the conductor 33. For the preferred embodiment, the large current relay 59 is not monitored by a current monitor such as the relay coil monitor 70.

For the preferred microprocessor 75, a model SC80C51B manufactured by Intel, Santa Clara, Calif., the ports of the microprocessor are set to a TTL high level upon a power reset of the microprocessor. Thus, the outputs of the inverting amplifiers 90e, 90f, and 90g are connected, respectively, to the inputs of the inverting amplifiers 90a, 90b, and 90c to prevent the microprocessor 75 from inadvertently energizing the relay coils of the relays 56, 57, and 59 during a power reset of the microprocessor.

Likewise, the relay 58 is not inadvertently energized during a power reset of the microprocessor 75 because a transistor $Q_5$ insures that the output of the inverting amplifier 90d outputs a TTL high level signal instead of a TTL low level signal during the power reset. When a selected port, Port P3.3, which is not used to output relay control signals, is set to a TTL high level, the transistor $Q_5$ turns ON because the TTL high level signal during the power reset is applied to the base of the transistor $Q_5$ via a resistor $R_{58}$. During transistor operation in the ON state, the collector of the transistor $Q_5$ is set to a ground potential because the emitter is tied directly to ground. Thus, the inverting amplifier 90d outputs a TTL high level signal to the relay 58 because the collector of the transistor $Q_5$ is connected to the input of the inverting amplifier 90d. In this manner, the inverting amplifier is 90e-g and the transistor $Q_5$ provide an anti-clatter circuit to prevent the activation of the relays 56-59 during a power reset of the microprocessor 75.

Those persons skilled in the art will recognize that a power reset protection circuit would not be necessary if the preferred microprocessor device did not set its ports to a TTL high level signal during a power reset.

The microprocessor 75 drives the LED 79 to provide a tamper warning by outputting a TTL low level signal from selected ports of the microprocessor. Specifically, Ports P.2, P.3, P.4, P.5, P.0/ADD, and P.1/AD1 are tied together and output a TTL low level signal having sufficient power to drive the LED 79. The output of each of those ports is connected to the cathode of the LED 79 via a bias resistor $R_{65}$. The anode of the LED 79 is connected to +5.6 volts. Thus, the LED 79 is illuminated when the TTL low level signal is applied to the diode cathode because the anode is set to a positive voltage.

Figure 3:
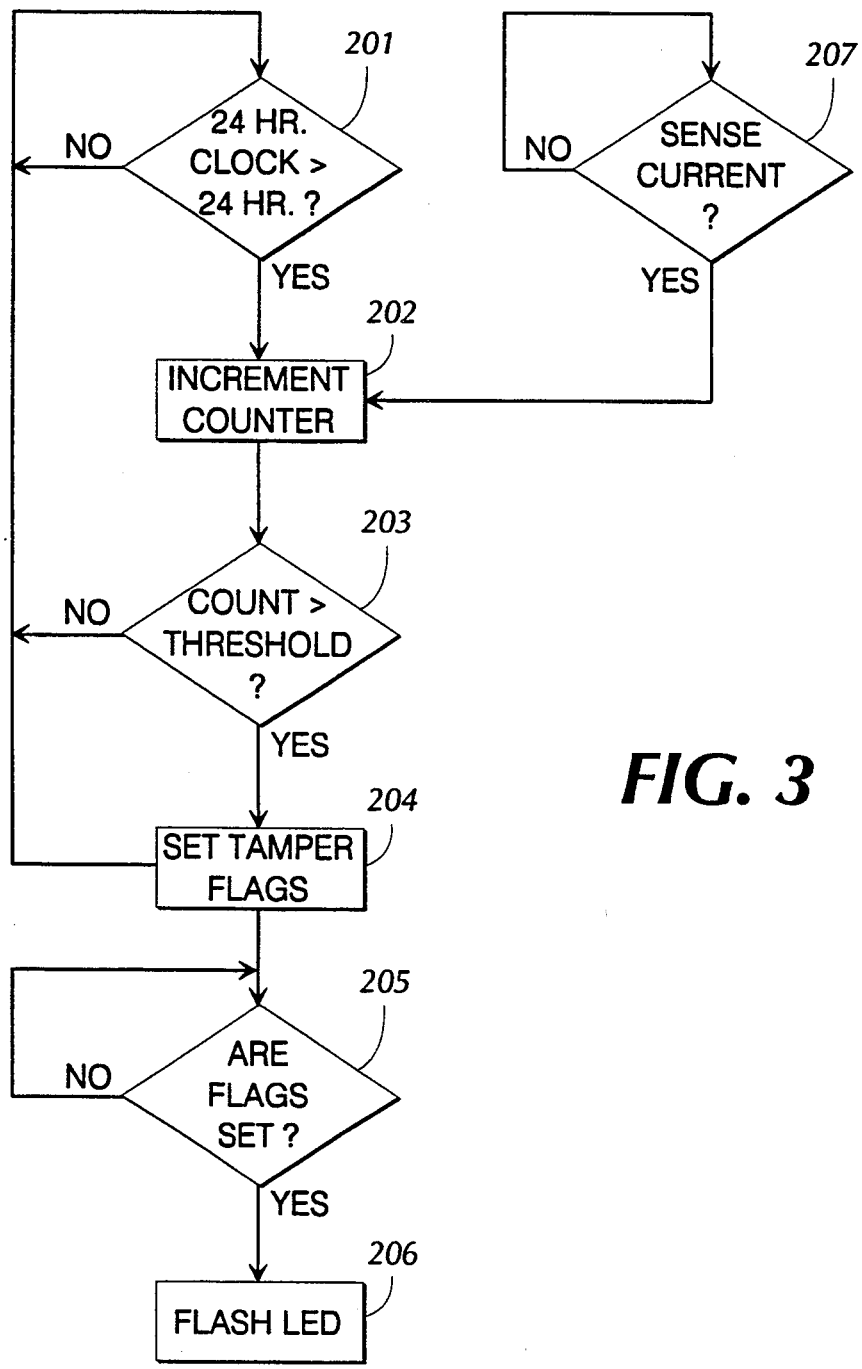
FIG. 3 is a flow chart showing the steps of a method for detecting and flagging disconnected load management devices.

The microprocessor 75 controls the tamper warning function of the load management device 20 in a manner shown diagrammatically in the flow chart of FIG. 3. FIG. 3 shows the logic for one of the current monitors 66 or 70 and a corresponding load 24,25 or 30, respectively; it should be understood that the microprocessor carries out identical functions for the other monitored load.

A counter within the microprocessor is set to increment following a preset time period, such as 24 hours, measured by a clock associated with the microprocessor. At step 201 in FIG. 3, the clock is monitored on a regular basis and an inquiry is conducted to determine whether the preset time has elapsed. Then, at step 202, the counter is incremented. At step 203, an inquiry is conducted to determine whether the counter has reached a predetermined count, such as several days. If so, the "Yes" branch is followed to step 204, during which the memory locations designated to indicate the state of connection or disconnection of the load, both in the microprocessor 75 and in the separate data storage device 78, are changed to a "tamper" state indicating disconnection of the load. Next, an inquiry is made regularly at step 205 to determine whether the memory locations have been set to indicate tampering. If the "Yes" branch is followed, a test LED on the load management device 20 is caused to begin flashing at step 206. The memory locations and flashing LED can be reset after indicating tampering only by a special command entered from the command center 35 or from an on-site programming device.

If, on the other hand, the "No" branch is followed from step 203, the program returns to step 201 and increments the counter after another preset time. However, during the steps described above, the current monitor 66 or 70 has been regularly inquiring at step 207 whether current has passed to the load through the load management device 20. If the "Yes" branch is followed from step 207 upon detection of current to the load, a signal is sent to reset the counter to zero. Preferably the "Yes" branch will be followed only when the detected current has continued for a minimum time, such as 4 minutes. When the counter is reset, the inquiry at step 203 will not result in setting the tamper flags in memory until such time as the count indicates that the full predetermined interval of no current has elapsed.

Thus, the microprocessor 75 uses the outputs from the current monitors 66 and 70 to determine whether a predetermined period of time has elapsed without any current passing via the load management device 20 to the monitored loads. If any monitored load receives no such monitored current for the predetermined period of time, this is taken to be evidence that the load has been disconnected from the contacts of it load control relay, and the tamper flags are set. The utility then has prompt warning that it has lost control of the load in question, and may be giving price incentives to the customer without receiving the corresponding benefit arising from the intended control of the load.

It will appreciated that various parameters of operation for the load control device 20 can be remotely programmed or altered by a utility when the command center sends a command containing new operating parameters. For example, a person skilled in the art will recognize that the predetermined period of time which must elapse prior to generating a warning signal when no current is detected, namely the first period of time, can be altered when the load management receiver 20 receives a command that includes a substituted first time period from the command center 35.

From the above description and drawings, many of the embodiments of the present invention may suggest themselves to those skilled in the art. Therefore, the scope of the present invention is to be limited only by the claims below.

I claim:

1. An apparatus for monitoring the connection status of a load control device, comprising:
   monitoring means for detecting whether a current is passing via said load control device to a load; and
   signal means responsive to said monitoring means for generating a warning signal when no current is detected by said monitoring means for a first predetermined period of time.

2. The apparatus of claim 1, wherein said monitoring means continuously detects whether a current is passing via said load control device to said load.

3. The apparatus of claim 2, wherein said load control device includes a relay circuit connected to alternately supply and terminate current to the load, and wherein said monitoring means comprises means for sensing a field induced in said relay circuit when current is passing via said load control device to said load.

4. The apparatus of claim 2, wherein said monitoring means comprises:
   a sensing conductor;
   a coupling loop, formed of magnetic material, surrounding said sensing conductor and a conductor connected to said load; and
   means for detecting current induced in said sensing conductor when current is passing via said load control device to said load.

5. The apparatus of claim 4, wherein said coupling loop comprises a ferrous toroid.

6. The apparatus of claim 1, further comprising:
   reset means for restarting said predetermined period of time upon detection of a current by said monitoring means.

7. The apparatus of claim 6, wherein said reset means is operable to restart said first-recited predetermined period of time after detection of a current by said monitoring means continuously for a predetermined second period of time.

8. The apparatus of claim 7, further comprising means for altering said first period of time.

9. The apparatus of claim 1, wherein said said load control device further comprises a data storage device including at least one memory location; and wherein said signal means is connected to said data storage device such that said warning signal sets a predetermined memory location in said data storage device to a predetermined state.

10. The apparatus of claim 9, further comprising means responsive to said predetermined memory location's being in said predetermined state for activating a visual indicator positioned on said load control device.

11. The apparatus of claim 9, further comprising data collection means for reading the state of said predetermined memory location.

12. The apparatus of claim 11, wherein said data collection means is operable at a location remote from said load control device.

13. A method for monitoring the connection status of a load control device, comprising the steps of:
   detecting whether a current is passing via said load control device to a load; and
   responsive to detection of no current passing via said load control device to said load for a predetermined period of time, generating a warning signal.

14. The method of claim 13, wherein said detecting step comprises continuously determining whether a current is passing via said load control device to said load.

15. The method of claim 14, wherein said load control device includes a relay circuit connected to alternately supply and terminate current to the load, and wherein said detecting step comprises sensing a field induced in said relay circuit when current is passing via said load control device to said load.

16. The method of claim 14, wherein said detecting step comprises:
   magnetically coupling a sensing conductor with a conductor connected to said load; and
   detecting current induced in said sensing conductor when current is passing via said load control device to said load.

17. The method of claim 16, wherein said coupling step comprises surrounding said sensing conductor and said conductor connected to said load with a ferrous toroid.

18. The method of claim 13, further comprising the step of restarting said predetermined period of time upon detection of a current.

19. The method of claim 18, wherein said restarting step comprises restarting said first-recited predetermined period of time after detection of a current continuously for a predetermined second period of time.

20. The method of claim 13, further comprising the steps of communicating said warning signal to a data storage device including at least one memory location; and in response to receipt of said warning signal setting a predetermined memory location in said data storage device to a predetermined state.

21. The method of claim 20, further comprising the step of activating a visual indicator positioned on said load control device responsive to said predetermined memory location's being in said predetermined state.

22. The method of claim 20, further comprising the step of reading the state of said predetermined memory location.

23. The method of claim 20, further comprising the step of reading the state of said predetermined memory location from a site remote from said load control device.

24. An apparatus for monitoring the connection status of a load control device, comprising:
   a monitor operative to detect whether a current is passing via said load control device to a load; and a signal generator, responsive to said monitor, operative to generate a warning signal when no current is detected by said monitor for a predetermined period of time.

25. The apparatus of claim 24, wherein said monitor continuously detects whether a current is passing via said load control device to said load.

26. The apparatus of claim 25, wherein said load control device includes a relay circuit connected to alternately supply and terminate current to the load, and wherein said monitor comprises a sensor operative to sense a field induced in said relay circuit when current is passing via said load control device to said load.

27. The apparatus of claim 25, wherein said monitor comprises:
- a sensing conductor;
- a coupling loop, formed of magnetic material, surrounding said sensing conductor and a conductor connected to said load; and
- a detector operative to detect current induced in said sensing conductor when current is passing via said load control device to said load.

28. The apparatus of claim 27, wherein said coupling loop comprises a ferrous toroid.

29. The apparatus of claim 24, further comprising:
- a reset circuit for restarting said predetermined period of time upon detection of a current by said monitor.

30. The apparatus of claim 29, wherein said reset circuit is operable to restart said first-recited predetermined period of time after detection of a current by said monitor continuously for a predetermined second period of time.

31. The apparatus of claim 30, wherein said first-recited predetermined period of time is altered in response to said load control device's receiving a selected command from a command center remotely located from said load control device.

32. The apparatus of claim 24, wherein said load control device further comprises a data storage device including at least one memory location; and wherein said signal generator is connected to said data storage device such that said warning signal sets a predetermined memory location in said data storage device to a predetermined state.

33. The apparatus of claim 32, wherein a visual indicator positioned on said load control device is activated when said predetermined memory location is set to said predetermined state.

34. The apparatus of claim 32, further comprising a data collector operative to rad the state of said predetermined memory location.

35. The apparatus of claim 34, wherein said data collector is operable at a location remote from said load control device.

* * * * *